US006211951B1

(12) United States Patent
Guch, Jr.

(10) Patent No.: US 6,211,951 B1
(45) Date of Patent: Apr. 3, 2001

(54) BORESIGHT ALIGNMENT METHOD

(75) Inventor: Steve Guch, Jr., Mount Dora, FL (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/375,207

(22) Filed: Aug. 16, 1999

(51) Int. Cl.$^7$ .............................. G01B 11/26; G01C 1/00
(52) U.S. Cl. ..................................... 356/152.1; 356/141.3; 356/141.5
(58) Field of Search .............................. 356/141.3, 141.5, 356/152.1

(56) References Cited

U.S. PATENT DOCUMENTS

| 4,422,758 | 12/1983 | Godfrey et al. . |
| 5,025,149 | 6/1991 | Hatfield, Jr. . |
| 5,872,626 | * 2/1999 | Lipscomb ............................. 356/141 |

* cited by examiner

*Primary Examiner*—Stephen C. Buczinski
(74) *Attorney, Agent, or Firm*—William M. Hobby, III

(57) ABSTRACT

A boresight alignment method is used for aligning a laser with an optical sighting system in a laser designator or the like. The method includes selecting a target formed of a flat sheet of material, such as a metal foil, supporting the selected target at the focus of a collimating telescope in the path of a laser beam of a laser and optical sighting system combination, such as in a laser designator, focusing the laser beam onto the one side of the target, and burning an aperture in the target with the laser beam. The method includes illuminating the target burned aperture from the rear thereof with a visible light or with an infrared source and then aligning the optical sighting system with the illuminated target aperture. Both the day and night viewing optics can be aligned by providing pinhole illumination with multi-spectral target pinhole illumination. The target may be mounted so that it can be rotated to provide successive alignments of the same or different laser optical sighting systems. The target can be an aluminum foil supported on a metal frame or with a paper or polymer backing. An optical sighting system can be aligned to a laser with high accuracy under rugged military and industrial field operating conditions.

19 Claims, 1 Drawing Sheet

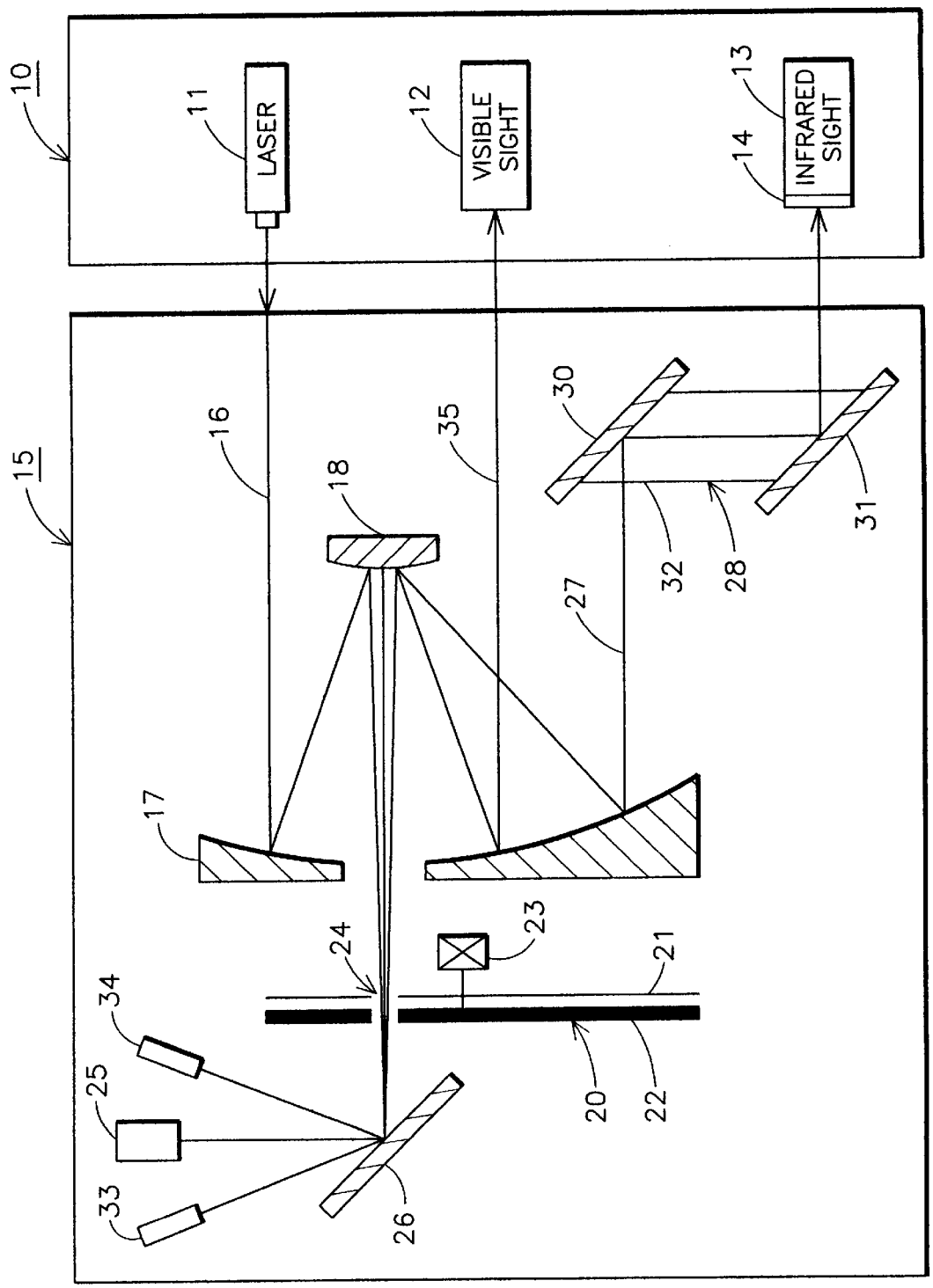

BORESIGHT ALIGNMENT METHOD

BACKGROUND OF THE INVENTION

The present invention relates to a boresight alignment method for aligning optical sighting systems with a laser which may provide such functions as rangefinder, designator, or target illuminator requiring accurate positioning of the beam at a distant point.

One of the major potential sources of error in laser targeting or tracking systems involves the boresight misalignment between the laser being directed at the target and the sighting system being used to aim the laser at the target. Modern military vehicles employ electro-optical fire control systems using multiple sensors to detect and track desired targets. The multiple sensors may include a visible sensor, a forward-looking infrared sensor, and an intensified night vision sensor, all of which may be disposed within the same instrument as the laser. In order to meet laser targeting performance goals, the boresight accuracy along the various sensors is required to be of high accuracy, e.g. 100 microradians. Conventional alignment systems for use with multiple sensors integrated into a single system may have poor boresight co-alignment among the sensors which results from a number of factors associated with the use of wholly or partially separate optical systems held in position by mechanical mountings with less than perfect stability. These systems are generally costly to build and align due to the reliance on precision fixturing, equipment, and assembly processes to produce the initial alignment setting which is often assumed to be maintained throughout the life of the system. The initial alignment settings however do not always maintain their settings throughout the life of the system. In fact, periodic boresight alignments need to be performed in cases such as when a laser optical system is utilized under rugged field conditions in which thermal or structural perturbations are likely to misalign optical sensors and laser(s) relative to each other. It is an object of the present invention to provide an improved boresight target alignment which allows viewing and rapid alignment of optical systems to a laser with high accuracy under rugged military or industrial field operating conditions.

In the past, field collimators for laser systems have taken two forms, ground systems and airborne systems. Ground systems (e.g., G/VLLD, MULE, PAL) have assumed that laser and day sight alignment are maintained with sufficient accuracy over differing environments, and have provided collimation systems that only align the day and night channels. This may be accomplished by centering a wire cross hair structure in the day sight and, using heating and/or emissivity effects, while viewing the cross-hairs against their natural background. The principle disadvantages of this class of systems is that they do not provide validation of the laser alignment directly to either beam line and the operator is obliged to move a sighting feature in the collimator to establish a reference line-of-sight. This can be particularly onerous, given that achievement of high accuracies in collimators always requires ensuring that they are very rigid structures and that they are not perturbed during use.

Airborne systems often use targets which interact with the laser beam to render it visible to one or more of the onboard sensors. In some cases, a frequency conversion process creates a green light which can be seen in the system day sight. Unfortunately, extension of this technique to a night sight requires the addition of a movable, heated aperture or cross hair, much as in a ground system. In the other cases, the target absorbs the laser energy in the focal plane and the temperature rises locally in the region of the beam, allowing it to be viewed by the thermal imager in the system. Unfortunately, a visible reticle or spot has to be coaligned by the operator in this case to allow use of this technique to align with the day channel.

By comparison with current practice, the present invention allows the use of a single reflective collimator to align many different sights in different spectral bands by simply backlighting a pinhole, burned by the laser in a foil or membrane located at the collimator focal point, with diffuse, incoherent illumination in all the desired bands. No additional adjustments or alignments within the collimator are needed once the pinhole has been burned. The simplicity, inherent mechanical stability, and lack of adjustments allow the key concepts of the invention to be embodied using collimator designs employing very high performance optical systems, e.g. high-magnification telephoto designs of short physical dimensions and lightweight systems using diamond machining of all components from a single alloy.

Prior art U.S. patents for boresighting of laser designation systems can be seen in U.S. Pat. No. 4,422,758 to Godfrey et al. for a boresighting of airborne laser designation systems. In this system, a laser beam is focused onto a refractory target in the boresighting device creating very briefly an incandescent hot spot which can be seen by all three sensors. Radiation from this hot spot is collimated by the boresight device optics and projected back into the sights exactly anti-parallel to the laser beam. By aligning the sight reticles with this hot spot, all three types of sights are aligned relative to the laser. This technique is limited, however, to operation with relatively high average power, high pulse rate or CW lasers to provide the desired heating and prevent problems seeing the beam in scanning thermal imaging sensors. In the prior U.S. patent to Hatfield, Jr., U.S. Pat. No. 5,025,149, an integrated multispectral boresight target generator combines visible and infrared sensors and a laser designator. A pinhole is illuminated with a multiband source to produce a single visible and infrared target which is detected by visible and infrared sensors. A pair of beam splitters and an associated corner reflector define the parallelism of the visible and infrared radiation transmitted from the multiband source along an optical axis. A reflective telescope is used to project the visible radiation to the visible sensor and the infrared radiation in conjunction with a periscope to the infrared sensor. The requirement to align the pinhole mechanically with the laser beam renders it of little use in a rugged field environment where the system is likely to be used by unsophisticated operators.

In contrast to these prior patents, the present invention allows the viewing and aligning of one or more optical systems to a laser with high accuracy under rugged military or industrial field operating conditions by using the laser designator to burn a pinhole in a foil or film located at the focal position of a collimator, which pinhole is subsequently backlit and viewed through the collimator by the optical sights to which the alignment is to be accomplished. The only operator actions required are to line up the individual sensor reticles to the illuminated spot, rather than the multiple adjustments required using prior techniques.

SUMMARY OF THE INVENTION

A boresight alignment method is used for aligning a laser with an optical sighting system in a laser designator or laser rangefinder or laser illuminator or the like. The method includes selecting a target formed of a flat sheet of material, such as a metal foil, located at the focal plane of an all-reflective collimating telescope, which is itself located in the path of a laser beam of a laser and optical sighting system combination, such as in a laser designator, focusing the laser beam onto the one side of the target, and burning an aperture in the target with the laser beam. The method includes illuminating the target burned aperture from the rear thereof with a visible light or with an infrared source and then aligning the optical sighting systems by viewing their alignment relative to the illuminated target aperture. Both the day and night viewing optics can be aligned by providing pinhole illumination with multispectral target pinhole illumination. The target may be mounted so that it can be moved so as to expose unburned areas to provide successive alignments of the same or different laser optical sighting systems. Potential target materials include metal (e.g. aluminum, stainless steel) or paper or polymer foils supported on a frame which positions it accurately in the collimator focal plane. An optical sighting system using this technique can be aligned to a laser with high accuracy (e.g. less than 100 microradians) under rugged military and industrial field operating conditions.

BRIEF DESCRIPTION OF THE DRAWINGS

Other objects, features, and advantages of the present invention will be apparent from the written description and the drawings in which:

The FIGURE is a diagrammatic representation of a boresight collimator used in the present method.

DESCRIPTION OF THE PREFERRED EMBODIMENT

Referring to FIG. 1 of the drawings, a diagrammatic view shows a laser designator 10 which has a laser 11 mounted therein along with a visible or daylight viewing scope 12 which also has a night scope 13 mounted therein. The night scope has an infrared sensor 14 which is employed in the operation of a laser designator. The laser 11 produces a beam which is directed at a target using either the daylight scope 12 or the night scope 13. The laser beam may be used for such diverse purposes as precision target ranging, target designation for precision weapon guidance, and target illumination for precision aimpoint selection for laser weapons.

In the present invention, a boresight collimator 15 is removably attached to the front of a laser designator 10 such that the laser beam 16 is directed into the boresight collimator 15 and is brought to a focus by the collimator optics formed by mirrors 17 and 18. The focused beam is applied directly to a target assembly 20 having a thin sheet of target material 21 which can, for instance, be a thin metal foil, such as a 0.003 inch aluminum foil, mounted to a support backing 22. The backing plate 22 can be made of a metal, such as aluminum having large openings therein, or alternatively, can have a paper or other backing member having the target foil 21 laminated thereto. Target 20 is rotatably mounted on a shaft 23 to allow the target 20 foil face 21 to be rotated to different positions.

The beam intensity from the focused laser 16 focused onto the foil 21 is sufficiently high at the focus that the foil material is burned or ablated away in the beam region to form a pinhole 24. After several shots from the laser 11, a nearly circular hole 24 is formed as a permanent mark of the beam location. The laser 11 is then shut down once the pinhole has been burned through the target foil 21 and through a laminated backing 22 if a solid backing is utilized. An infrared source 25 is energized and light from the infrared source strikes the diffusing reflector 26 and illuminates the pinhole 24 from the rear of the target foil 21. The illumination from the infrared source 25 illuminates the hole 24 created by the laser beam. The image of the hole created by the illumination process is then projected in space back through the collimating optic mirrors 17 and 18 in a return beam 27 which is directed into a periscope rhomb assembly 28 formed with mirrors 30 and 31 held parallel to each other by a spacer 32. The projected infrared beam is then directed into the thermal imager 13, which forms an image at the spot as well as creating electronically its own reticle indicating the line-of-sight. The thermal imager reticle is then adjusted electronically to center the image of the pinhole 24 burned by the laser designator laser 11. The infrared source 25 may then be deenergized. Visible light sources 33 and 34 may then be energized, directing their light energy onto the diffusing reflector 26 to illuminate the pinhole 24 created by the beam 16. The image of the pinhole 24 is then projected in space back out through the collimating optics 17 and 18 where it passes into the input aperture of the day sight 12. The reticle indicating the line-of-sight of the day sight 12 can then be adjusted to center it on the pin hole 24 burned by the laser 11.

In this way, the day sight 12 and the night sight 13 can be brought into alignment with the laser 11 to align the complete optical sighting system in a laser designator 10 or the like. The boresight collimator 15 can be used multiple times since the target foil 21 and its backing plate 22 are circular in shape and can be rotated on the axial shaft 23 to many different positions to align an unburned area facing the center portion of the output from the collimator optics 17 and 18. Thus, a series of alignments can be made before having to replace the target foil 21. Once the alignment has been made for the laser designator 10, the boresight collimator 15 can be removed from the front thereof. After multiple collimation operations (such as 40), the target foil 21 and backing plate 22 are removed and replaced. Mechanical stops or detents are used to allow this process to be accomplished without the need for refocusing the optical system.

The boresight alignment method for aligning a laser with an optical sighting system includes locating a target formed of a flat sheet of material 21 supported in the focal plane of a collimating telescope in the path of a laser beam 16 from a laser and optical sighting system combination 10, and burning an aperture or pinhole 24 in the target with the laser beam. The process includes illuminating the target burned aperture from the rear side thereof with an illumination energy which may include an infrared source 25 or, alternatively, visible light sources 33 and 34. Once the pinhole 24 has been illuminated, the night scope 13 can be optically aligned with the pinhole exactly with the path of the laser beam 16 and/or the day scope 13 can be optically aligned with the pinhole 24 which aligns its line-of-sight parallel with the laser 11 beam 16. Once the alignment is completed, the boresight collimator 15 is removed from its position in front of the laser designator.

The aligning method of the present invention has proven useful in military rangefinders and designators for aligning one or more optical sighting systems to accuracy better than a 10 arc seconds and can provide this alignment in an operation environment with temperatures between –54 C to +71 C. In such systems, daysight and laser are both contained within a target designator unit and have their beam lines sufficiently close together that they can be input directly into the collimator telescope, while an extended hollow periscope 28 assembly using parallel diamond turned optics mounted on either end of a diamond turned hollow tube transfers the thermal imager line-of-sight into the input aperture of the telescope without adding significant angular error in the line-of-sight. The focal position of the telescope is the target which may be fired at with the beam 16 from the laser 11 at a typical 10 to 20 Hz rate to melt or burn the pinhole 24 through the foil 21. The pinhole 24 is diffusely backlit by a yellow light emitting diode for viewing by the daysight or a CARLY IR emitting source for viewing by the nightsight. The operator sequentially observes the illuminated pinhole 24 in the two sights 12 and 13 and uses the sight adjustments of the line-of-sight angles to bring all beam lines into coincidence.

It should be clear at this time that a field boresight collimator has been provided which uses a self-generated pinhole reference with diffuse pinhole illumination from the rear thereof to obtain an accurate alignment of a laser designator rangefinder or the like. However, the present invention should not be considered limited to the form shown which is to be considered illustrative rather than restrictive.

I claim:

1. A method of aligning an optical sighting system with a laser comprising the steps of:

focusing a laser beam of an optical sighting system through a collimating telescope onto one side of a target of sheet material;

impinging sufficient laser energy from said laser beam to burn a pinhole in said target sheet material;

directing a light onto said target pinhole from the other side thereof;

viewing said lighted pinhole with said optical sighting system; and adjusting said optical sighting system to align said optical lighting system with said lighted target pinhole;

whereby a laser and optical sighting system are aligned with each other.

2. A method of aligning an optical sighting system to a laser in accordance with claim 1 in which said step of directing a light includes directing an infrared light source onto said target pinhole.

3. A method of aligning an optical sighting system to a laser in accordance with claim 1 in which said step of directing a light includes directing a visible light source onto said target pinhole.

4. A method of aligning an optical sighting system to a laser in accordance with claim 1 in which said step of directing a light includes directing an infrared light source onto said target pinhole for alignment of night vision optics and directing a visible light source onto said target pinhole for day vision optics.

5. A method of aligning an optical sighting system to a laser in accordance with claim 1 in which said step of focusing a laser beam on a target includes focusing a beam on a target of sheet material having a backing support thereon.

6. A method of aligning an optical sighting system to a laser in accordance with claim 1 in which said step of focusing a laser beam on a target focuses the laser beam onto a target of thin metal foil.

7. A method of aligning an optical sighting system to a laser in accordance with claim 6 in which said step of focusing a laser beam on a target focuses the laser beam onto a target of thin aluminum foil.

8. A method of aligning an optical sighting system to a laser in accordance with claim 1 in which said step of focusing a laser beam on a target focuses the laser beam onto a target of thin sheet material held to a backing support.

9. A method of aligning an optical system to a laser in accordance with claim 8 in which said step of focusing a laser beam on a target focuses the laser beam onto a target of thin metal foil held to a backing support of metal having a plurality of openings therethrough.

10. A method of aligning an optical sighting system to a laser in accordance with claim 1 in which said target is rotatably mounted for rotating between positions and includes the step of rotating said target to position a'surface for realignment of said laser and optical sighting system.

11. A boresight alignment method for aligning a laser with an optical sighting system comprising:

selecting a target formed of flat sheet material;

supporting said selected target at the focus of a collimating telescope in the path of a laser beam of a laser and optical sighting system combination;

burning an aperture in said target with said laser beam;

illuminating said target burned aperture from one side thereof;

aligning said optical sighting system with the illuminated target aperture to thereby align said laser beam with said optical sighting system.

12. A boresight alignment method for aligning a laser with an optical sighting system in accordance with claim 11 in which the step of illuminating said target burned aperture includes illuminating said target aperture with an infrared light source.

13. A boresight alignment method for aligning a laser with an optical sighting system in accordance with claim 11 in which the step of illuminating said target burned aperture includes illuminating said target aperture with either an infrared or visual light source.

14. A boresight alignment method for aligning a laser with an optical sighting system in accordance with claim 11 in which the step of illuminating said target burned aperture includes illuminating said target aperture with a multi-spectral light source.

15. A boresight alignment method for aligning a laser with an optical sighting system in accordance with claim 11 in which the step of selecting a target includes selecting a thin metal foil target.

16. A boresight alignment method for aligning a laser with an optical sighting system in accordance with claim 15 in which the step of selecting a target includes selecting an aluminum foil target.

17. A boresight alignment method for aligning a laser with an optical sighting system in accordance with claim 11 in which the step of supporting said selected target includes supporting said selected target on a backing support having a plurality of holes therein.

18. A boresight alignment method for aligning a laser with an optical sighting system in accordance with claim 17 in which the step of supporting said selected target includes rotatably supporting said selected target and backing support for rotating said target for successive alignments of said laser and optical sighting system.

19. A boresight alignment method for aligning a laser with an optical sighting system in accordance with claim 11 including the step of selecting collimating optics having a periscope rhomb therein for focusing said laser beam onto said target and boresighting said optical sighting system with said laser.

* * * * *